Oct. 23, 1951   J. X. AMBEAULT   2,572,581
UNREELING AND FEEDER DEVICE FOR SHEET WOOD CLIPPERS
Filed Jan. 10, 1947   2 SHEETS—SHEET 1

INVENTOR
JOSEPH.X.AMBEAULT
BY Featherstonhaugh &Co.
ATTORNEYS

Oct. 23, 1951   J. X. AMBEAULT   2,572,581
UNREELING AND FEEDER DEVICE FOR SHEET WOOD CLIPPERS
Filed Jan. 10, 1947   2 SHEETS—SHEET 2

INVENTOR
JOSEPH. X. AMBEAULT
BY Fetherstonhaugh & Co.
ATTORNEYS

Patented Oct. 23, 1951

2,572,581

UNITED STATES PATENT OFFICE 2,572,581

UNREELING AND FEEDER DEVICE FOR SHEET WOOD CLIPPERS

Joseph X. Ambeault, Ste. Therese de Blainville, Quebec, Canada, assignor, by mesne assignments, to Commonwealth Plywood Company Limited, Ste. Therese, Quebec, Canada Application January 10, 1947, Serial No. 721,320

2 Claims. (Cl. 164—49)

This invention relates to an unreeling and feeder device for feeding a green wood sheet to be cut into desired lengths for the manufacture of plywood panels.

A particular object of this invention is to provide a sheet wood feeder table with automatic means for unreeling and feeding a green wood sheet from a reel to be cut into predetermined lengths by a clipper mechanism.

A further object is to provide a brake means for controlling the feeding of the green wood sheet so that the said sheet may be cut into the desired lengths.

Heretofore, feeder tables of this type have been provided with hand operated feeder rollers and the operator was required to feed the sheet wood by operating a hand crank. This hand crank was located at one end of the feeder roller shaft in such a position that the operator was required to be at right angles to the line of work. This was a comparatively awkward, strenuous, and slow process of operation. In addition to which the operator quickly tired. As a result, any standard of efficiency or skill in workmanship was difficult to maintain.

One of the features of the present invention is that the operator may now face his line of work in order to manipulate the feeding and control devices. Thus, the operator is at a particular advantage since he can now watch his work while manipulating the controls.

Another feature resides in the reduction of manual labour. This has the advantage of greatly increasing the efficiency and skill of the operator.

A still further advantage is that the automatic feeder device speeds up the production without sacrificing the skill of workmanship.

Other objects, advantages and characteristic features of the invention will be more readily understood from the following detailed description in connection with the accompanying drawings, in which—

Figure 1:
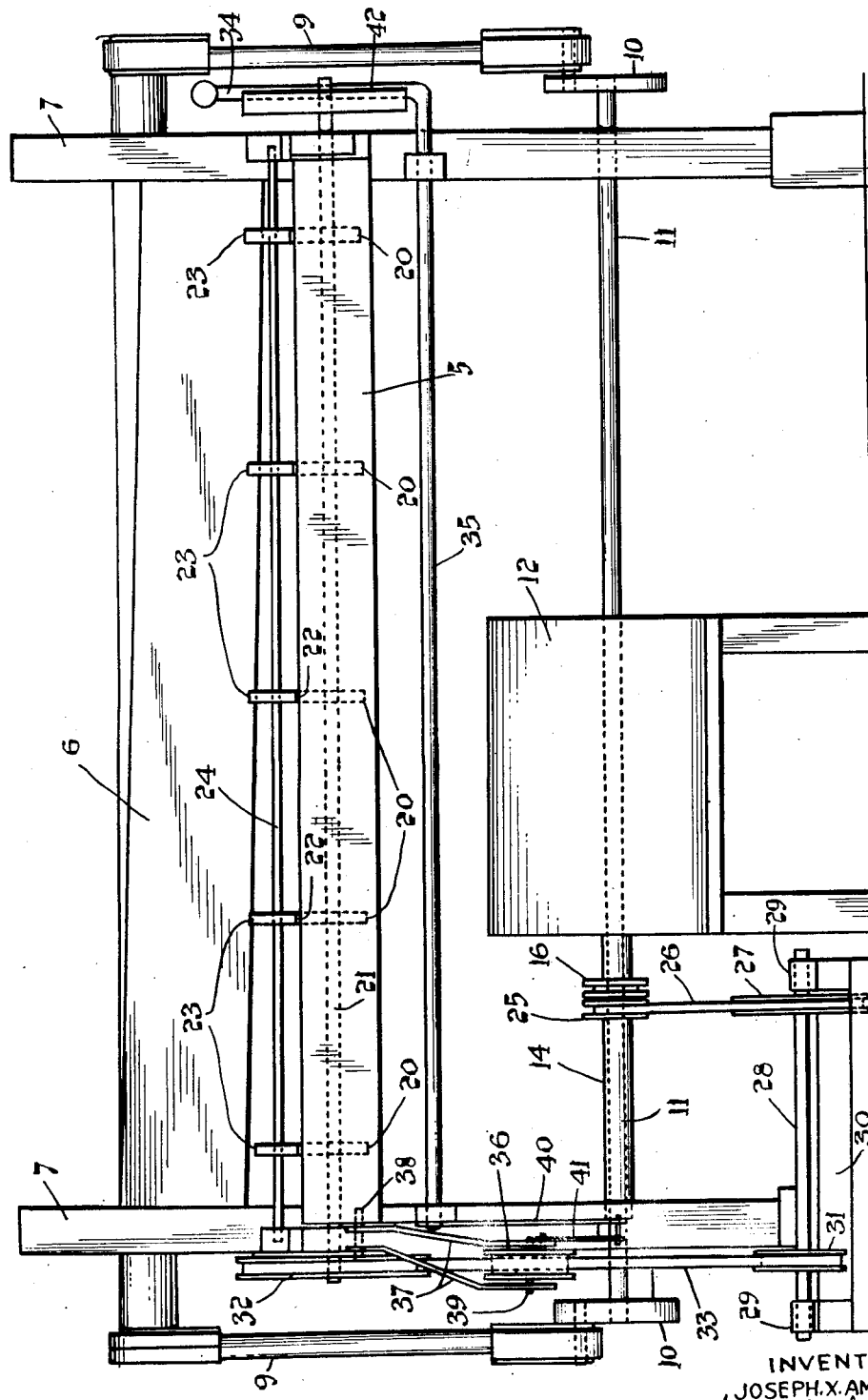
Fig. 1 is an elevational view of the feeder table showing the automatic feeder and brake mechanism embodied in the present invention.
Figure 2:
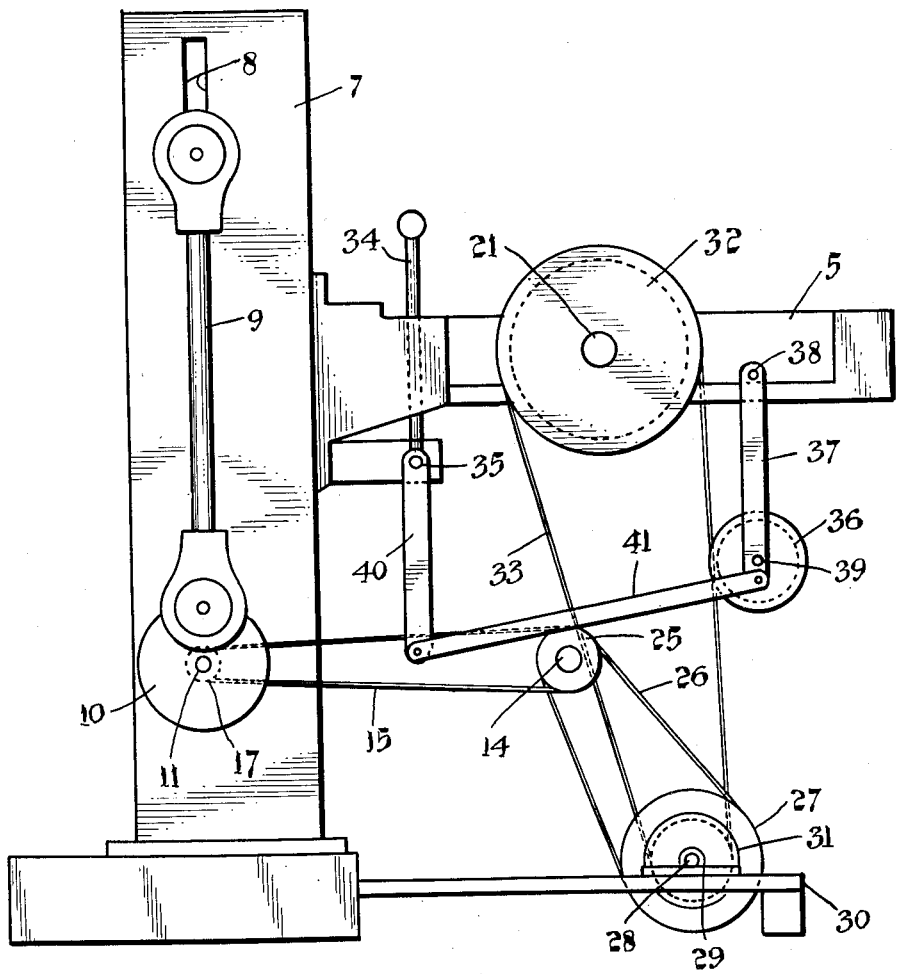
Fig. 2 is an end elevational view of the feeder mechanism shown in Fig. 1.

Referring more particularly to the drawings, 5 designates a feeding table for feeding a sheet of green wood to be used in the manufacture of plywood, said green wood sheet being fed from a spool or roll (not shown) to be cut by a clipper 6. The clipper 6 is of the conventional guillotine knife type mounted in posts 7 at the forward end of the table and is adapted to chop the green wood sheets into strips of predetermined lengths. The clipper, which is normally maintained in its ascended position by any suitable means, is slidable in vertical guide rail members 8 carried by posts 7. Straps 9 connect the clipper to eccentric wheels 10 which are fixed to rotate on a shaft 11. Shaft 11 is geared to a motor 12 through a chain drive mechanism including a motor 12 having a motor shaft 14, a driving chain 15 connecting sprocket gears 16 and 17 carried by motor shaft 14 and eccentric wheel shaft 11, respectively. When it is desired to operate the clipper, an operator steps on a clutch pedal (not shown) which engages the drive mechanism causing eccentric wheels 10 to be rotated. Straps 9 connecting clipper 6 to eccentric wheels 10 cause the clipper to descend in guide rail members 8, clipping the green wood sheet which is fed thereto on the table surface.

The mechanism referred to above is conventional and, as such, is well understood by those skilled in the art of clipping green wood sheets into strips to be used in the manufacture of plywood. Therefore, brief reference to its mechanism in general and its mode of operation is deemed sufficient to bring out its correlation with the present invention as hereinafter described and claimed.

Feeding table 5 is provided with a plurality of transversely arranged feeder rollers 20 mounted on a shaft 21 below the surface of the table so that the upper edges of said rollers project through openings 22 in the surface of the table. Hold-down rollers 23 carried by shaft 24 are transversely arranged above the surface of table 5 to cooperate with feeder rollers 20 so as to press the green wood sheet against rollers 20 for feeding the same to the clipper 6.

The present invention provides for a feeder roller mechanism which is driven by motor 12. The motor shaft 14 is provided with a pulley 25 which is connected by a V drive belt 26 to a pulley 27 mounted at one end on a drive shaft 28. Shaft 28 is journalled in suitable bearings 29 of a base 30 and is provided with a slip pulley 31 adjacent its other end. Pulley 31 is caused to rotate continuously with shaft 28 which is linked to motor shaft 14 through drive belt 26. A feeder roller driving pulley 32 is mounted on feeder roller shaft 21 in alignment with slip pulley 31 and a second V drive belt 33 is loosely hung about said pulleys 32 and 31.

A lever 34 mounted on the right hand side of table 5 is connected by a shaft 35 to a belt tightening mechanism. Said mechanism comprises a belt tightening wheel 36 suspended in alignment with loose drive belt 33 by means of straps 37 pivotally connected to table 5 by pivotal connection 38, said wheel being fixed to rotate about an axis pin 39 mounted in the lower portion of straps 37. A toggle bar 40, having one end secured to the free end of shaft 35, is linked to the lower end of belt tightening straps 37 by means of a link connection 41. When it is desired to feed the green wood sheet to be clipped, lever 34 is moved rearwardly. Shaft 35, operating the toggle mechanism, moves belt tightening wheel 36 against drive belt 33. In this manner belt 33 is brought into frictional engagement with revolving slip pulley 31 setting the feeder rollers 20 in motion through the driving force imparted to driving pulley 32.

The belt tightening mechanism is normally suspended in an idling position free of engagement with drive belt 33. Therefore the release of operating lever 34 causes belt tightening wheel 36 to swing out of pressure contact with drive belt 33, thus releasing the driving force of the feeder rollers 20. Since there is a certain momentum imparted to the feeder rollers through the driving force, a hand operated brake wheel 42 is provided. Brake wheel 42 is mounted on feeder roller shaft 21 at the right hand end thereof. The operator can thereby apply hand pressure to brake wheel 42 to stop the feeding of the green wood sheet at a predetermined point in order to clip said sheet.

From the foregoing it will be readily appreciated that an experienced operator can feed and clip the green wood sheets into desired lengths at a rapid rate and with comparative ease. The lever 34 may be operated with the right hand to feed the sheet. When approximately the desired length is reached, the lever is released and brake 42 is applied with the left hand. The clutch pedal is operated by foot for clipping the sheet and feeding operation is then immediately repeated.

I claim:

1. Apparatus for feeding a sheet of wood veneer to a clipper comprising a feeder table, a sheet wood clipper mounted at one end of said table, a feeder roller shaft rotatably supported by said table in advance of said clipper, feeder rollers fixed to rotate with said shaft to continuously engage a sheet of wood veneer for feeding it over the table towards said clipper, means for operating said clipper including a power driven shaft, a feeder roller driving shaft, means for driving said feeder roller driving shaft from said clipper operating power shaft, a loose belt connecting said feeder roller shaft and said feeder roller drive shaft, a belt tightener mounted for rotation between a pair of arms, said arms being pivotally connected at their upper ends to said table for swinging suspension of said belt tightener into and out of engagement with said belt, said belt tightener being normally suspended out of engagement with said loose belt, and a manually operated lever mechanism mounted beneath said table and linked to said belt tightener, said lever mechanism being operable for engaging said belt tightener with said loose belt to render the latter effective for driving the feeder roller shaft from the feeder roller drive shaft, said belt tightener also being returnable to its normal suspended position upon release of said lever mechanism.

2. Apparatus as set forth in claim 1, including a brake mechanism carried by said feeder roller shaft and operable for interrupting the feed of the veneer by said feeder rollers to the clipper during operation of said clipper.

JOSEPH X. AMBEAULT.

REFERENCES CITED

The following references are of record in the file of this patent:

UNITED STATES PATENTS

| Number | Name | Date |
|---|---|---|
| 517,558 | Ward | Apr. 3, 1894 |
| 999,352 | Waring | Aug. 1, 1911 |
| 1,783,023 | Martin | Nov. 25, 1930 |